(12) United States Patent
Giallombardo et al.

(10) Patent No.: US 6,379,834 B1
(45) Date of Patent: *Apr. 30, 2002

(54) COMPOSITION OF A SELECTIVE OXIDATION CATALYST FOR USE IN FUEL CELLS

(75) Inventors: James R. Giallombardo, Beverly; Emory S. De Castro, Nahant; Robert J. Allen, Saugus, all of MA (US)

(73) Assignee: De Nora S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/669,165

(22) Filed: Sep. 25, 2000

Related U.S. Application Data (62) Division of application No. 09/271,664, filed on Mar. 17, 1999, now Pat. No. 6,165,636.
(60) Provisional application No. 60/081,725, filed on Apr. 14, 1998.
(51) Int. Cl.[7] .................................................. H01M 4/92
(52) U.S. Cl. ......................... 429/44; 429/40; 204/283; 204/284; 204/293; 502/101; 502/180; 502/185; 502/313
(58) Field of Search ..................... 429/44, 40; 204/283, 204/284, 293; 502/101, 180, 185, 313; 420/466, 900

(56) References Cited

U.S. PATENT DOCUMENTS 6,165,636 A * 12/2000 Giallombardo et al. ....... 429/44

* cited by examiner

*Primary Examiner*—Bruce F. Bell
(74) *Attorney, Agent, or Firm*—Bierman, Muserlian and Lucas (57) ABSTRACT

This invention pertains to improved formulations of platinum-molybdenum alloys for use as anode catalysts. These electrocatalysts find utility as a constituent of gas diffusion electrodes for use in fuel cells that operate at less than 180° C. or in applications whereupon hydrogen is oxidized in the presence of carbon monoxide or other platinum inhibiting substances. The new formulations derive unexpected activity through creating highly dispersed alloy particles of up to approximately 300 Å on carbon supports. The desired activity is achieved by carefully controlling the platinum to molybdenum ratio during preparation and judiciously selecting a proper loading of alloy on the carbon support.

4 Claims, 8 Drawing Sheets

COMPOSITION OF A SELECTIVE OXIDATION CATALYST FOR USE IN FUEL CELLS

PRIOR APPLICATIONS

This application is a division of U.S. patent application Ser. No. 09/271,664 filed Mar. 17, 1999, now U.S. Pat. No. 6,165,636 which is based on provisional application Ser. No. 60/081,725 filed Apr. 14, 1998.

STATE OF THE ART

As mankind expands his presence and activity throughout the world, he is often limited by the availability of electrical energy to support his endeavors. Fuel Cells offer one solution to this dilemma by directly deriving electricity from chemical feedstocks such as oxygen and hydrogen. The Fuel Cell approach also offers the potential to reduce pollution problems inherent in direct combustion technology. Applications for Fuel Cells include power for vehicular traction, stationary power for home and industry, and power supplies for marine use. However, pure hydrogen fuel is not always available, and the development of distribution means for hydrogen is uncertain.

In order for the Fuel Cell technology to realize the potential as a generic energy source, flexibility in the choice of fuel is needed. Large-scale technology such as Solid Oxide Fuel Cells (SOFC) and Phosphoric Acid Fuel Cells (PAFC) achieve some feed flexibility by operating at high temperatures, and thus "burn" some of the anode contaminants that typically result from deriving hydrogen from carbon-containing feedstocks such as methane or propane. Both PAFC and SOFC technology are not amenable to the smaller scales (approximately <200 Kwatts) envisioned for automotive, and other applications cited above.

The Polymer Electrolyte Membrane Fuel Cell (PEMFC) is often cited as the appropriate energy source for applications requiring less than around 200 kWatts, and also for devices needing as little as a few hundred watts. This class of fuel cell operates at less than 180° C., and more typically around 70° C. due to the limitations in the stability of the polymer electrolyte membrane. There is great enthusiasm behind the PEMFC approach based on this system's lack of liquid electrolyte, ease of construction, and high specific power as a function of volume or mass.

In order to impart some fuel flexibility for the PEMFC, an additional fuel-reforming component is needed. The "reformer" converts hydrogen-containing substances such as methane, propane, methanol, ethanol, and gasoline into hydrogen gas, carbon monoxide, and carbon dioxide through either a steam reformation reaction, partial oxidation, or a combination of both. Reformer technology has now advanced to the state whereby commercially units are available. For example, a newly formed company Epyx (Acorn Park, Cambridge, Mass.) offers a fuel processor that converts gasoline into hydrogen. Johnson Matthey PLC (London, UK) offers a HotSpot™ fuel processor that converts methanol using a combination of steam reforming and partial oxidation. For both these technologies, the untreated output is hydrogen and approximately 1–2% carbon monoxide. Through additional clean-up, the carbon monoxide can be reduced to around 50 ppm or less.

Platinum has long been acknowledged as the best anode catalyst for hydrogen. Early fuel cells employed particles of platinum black mixed with a binder as a component in gas diffusion electrodes. The use of platinum black for hydrogen has been largely supplemented by the highly disperse and very active catalysts created by the methods similar to that found in Petrow and Allen, U.S. Pat. No. 4,082,699. This patent teaches the use of using finely divided carbon particles such as carbon black as the substrate for small (tens of angstroms) particles of the noble metal. Thus called a "supported" catalyst, this methodology has shown superior performance and utilization of: the catalyst in electrochemical applications. However, while supported platinum catalysts have demonstrated high activity for hydrogen oxidation, this proclivity for facile kinetics is severely retarded with carbon monoxide concentrations of only a few ppm.

Thus, with a fuel processor technology producing hydrogen streams containing around 50 ppm CO and platinum-based gas diffusion anodes being poisoned slowly with as little as 1 ppm, there is a clear need for a CO tolerant catalyst. The current state-of-the-art CO tolerant electrocatalyst is a platinum ruthenium bimetallic alloy (Pt:Ru) and is available commercially in supported form (E-TEK, Inc., Natick, Mass.). The mechanism for CO tolerance is believed to involve the nucleation of oxygen containing species $(OH_{ads})$ on the ruthenium site such that platinum-adsorbed CO can participate in a bimolecular reaction with the activated oxygen thereby freeing the platinum site for hydrogen oxidation. However, the ruthenium site is also prone to poisoning by CO at higher concentrations of CO, and the important nucleation of oxygen containing species is then inhibited (H. A. Gasteiger, N. M. Markovic, and P. N. Ross; *J. Physical Chemistry*, Vol. 99, No. 22, 1995, p 8945). Although Pt:Ru has been optimized and thoroughly studied to show that an alloy composed of Pt:Ru in the atomic ratio of 1:1 yields the best tolerance to CO, this bimetallic catalyst functions only at around 10 ppm CO or less because of the eventual poisoning of the ruthenium site.

A recent monograph reviewing bimetallic electrocatalysts has summarized several important facts in the preparation and activity of electrocatalysts (P. N. Ross: "The Science of Electrocatalysis on Bimetallic Surfaces," in *Frontiers in Electrochemistry* Vol. 4, J. Lipowski and P. N. Ross Jr., Wiley-Interscience, New York, N.Y., 1997). The activity of a bimetallic catalyst is dependent on electronic and structural effects. Electronic properties are determined by the electron configuration of the alloying elements while structural properties are determined by both the selection of alloying elements and the method of preparation of the alloy itself. This last observation is important in the design of CO tolerant catalysts. For example, a Pt:Ru alloy prepared by sputtering a bulk alloy, annealing a bulk alloy, or depositing a submonolayer of ruthenium on platinum all yield fundamentally different catalytic properties (P. N. Ross, p 19). The precept that alloy formation methodology influences catalyst function follows from the creation of three zones in every bimetallic catalyst: metal "A", metal "B", and an intermixed zone "A–B". The distribution of these zones determines activity.

Another important property noted by Ross in the monograph is that the phenomenon of surface segregation in bimetallic alloys has often been neglected. Surface segregation is the enrichment of one element at the surface relative to the bulk, and in our case would be dominated by platinum in an alloy of 4d elements with the exception of silver and tin (Ross, p. 51).

In summary, there is ample evidence to show that electrocatalysts can differ in their activity due to preparation methods. Another difference arises from dissimilarities between the bulk and surface compositions of the alloy. For these two reasons, we expect even greater contrasts to occur between bimetallic alloys prepared as bulk metals compared to alloys prepared as very small (10 to 300 Å) supported particles.

Molybdenum has been observed to play a catalytic role in the oxidation of small organic molecules otherwise known as "C1" molecules (to designate one carbon atom). As early as 1965, a molybdenum platinum black complex was implicated in the catalytic oxidation of formaldehyde and methanol in sulfuric acid (J. A. Shropshire; *Journal of the Electrochemical Society*, vol. 112, 1965, p. 465). Although the molybdenum was added as a soluble salt, it was reduced and deposited onto the platinum black electrode. Later on, several others took note of this property of molybdenum and tried to intentionally create platinum alloys. H. Kita et al. confirm that a platinum molybdenum complex formed through reduction of the metal salt onto the surface of the platinum foil electrode can catalyze methanol oxidation (H. Kita et al.; *J. Electroanalytical Chemistry*, vol. 248, 1988, p. 181). H. Kita extended this work to creating a membrane electrode assembly (MEA) of chemically deposited platinum and molybdenum on Nafion, to be used in a PEMFC. As before, the fuel here is methanol (H. Kita et al.; *Electrochemistry in Transition*, Oliver Murphy et al., Eds., Plenum Press, New York, 1993, p. 619). These are both examples of forming an alloy through deposition of a submonolayer of molybdenum onto platinum although no high surface area support is used.

Masahiro Watanabe discloses the use of vacuum sputtering to form an alloy of Ni, Co, Mn or Au with Pt, Pd, or Ru. The object of this patent is to provide a CO tolerant anode catalyst for the PEMFC (Masahiro Watanabe: Japan Patent Application No. H6-225840, Aug. 27, 1994). Although this patent directs towards a preferred alloy consisting of Pt with Ni, Co, Mn, or Au, a comparison example of Pt with Mo is shown whereby sustained currents for hydrogen oxidation in the presence of CO dissolved in sulfuric acid are recorded. The example employs a rotating disk electrode coated with an alloy formed by simultaneous argon sputtering under reduced pressure. While the patent emphasizes the use of sputter coating, some mention is made to carbon supported alloys prepared by the usual thermal decomposition methods. However, there is no description or teaching as to how the properties achieved in a sputter-coated alloy could be obtained by thermal decomposition onto carbon black.

A recent publication indicates the potential for Pt:Mo as a CO tolerant catalyst superior to Pt:Ru (B. N. Grgur et al.; *Journal of Physical Chemistry* (B), vol. 101, no. 20, 1997, p. 3910). In this paper, a sample of $Pt_{75}Mo_{25}$ alloy is prepared as a bulk crystal by arc melting of the pure elements in an argon atmosphere and homogenizing with a heat treatment. The authors show that the resulting boule possessed a uniform metal alloy composition from the interior bulk to the surface. This well characterized surface is formed into a rotating electrode disk and shows oxidation of hydrogen in a mixed gas of $H_2/CO$. The authors put forth evidence that the molybdenum may participate in a greater rate of CO oxidation compared to the ruthenium. Furthermore, the authors point out that ruthenium and platinum do not differ much in that they both absorb $H_2$ and CO, possess quasireversible $OH_{ads}$ states, and are electrocatalysts for $H_2$ and CO: the alloying process does not produce a fundamental change in the properties of either metal. On the other hand, molybdenum is significantly different than platinum and formation of the alloy produces a material with substantial differences in the intrinsic chemical properties. While the authors relate a surface with unexpected catalytic properties, there is no mention of how one could translate the properties discovered in this bulk alloy to the highly disperse carbon supported catalysts employed in gas diffusion electrodes.

There has been some effort in the patent literature to create the supported Pt:Mo alloy on carbon blacks. Landsman et al. in U.S. Pat. No. 4,316,944 describe a method to form noble metal chromium alloys on carbon black for eventual incorporation into a cathode of a fuel cell. In this case, the inventors were seeking superior oxygen reduction catalysts for use with PAFC. They make use of a powder of already-dispersed platinum on metal and a solution of ammonium chromate. The addition of dilute hydrochloric acid was added to cause the adsorption of the chromium species on the supported catalyst. Heat treatment in nitrogen was used to form the platinum chromium alloy. Although Pt:Mo appears in a table of results as a cathode catalyst, no details are given to its preparation, metal:metal ratio, or metal on carbon weight loading.

Thus, there is a need to show a method of preparation and formulation requirements that preserve the unexpected CO tolerant properties of Pt:Mo on carbon black supports that would then allow this alloy to be readily incorporated into gas diffusion electrodes or membrane electrode assemblies (MEAs).

SUMMARY OF THE INVENTION

It is an object of this invention to provide an improved high-surface area formulation of platinum:molybdenum on a carbon support whereby: the bulk atomic ratio of Pt:Mo is between 99:1 and 1:1, preferably between 3:1 and 5:1, and more preferably 4:1; and the metal loading of alloy on carbon support is between 1% and 80% total metal on carbon, preferably between 20% and 40%.

It is a further object of this invention to provide an anode catalyst for a fuel cell whereby hydrogen can be oxidized in the presence of carbon monoxide.

It is also an object of this invention to provide a method of manufacturing supported platinum molybdenum alloy with highly desirable surface activity.

It is a final object of this invention to provide an anode catalyst with high activity for the direct oxidation of small organic molecules such as methanol.

Amongst the aforementioned methods of forming a bimetallic alloy, we have found that a combination of deposition and bulk annealing forms the most potent form of the alloy. As has been previously established, the precipitation of metal salts onto carbon black supports can yield highly disperse formulations of metal. For example, through the teachings of Petrow and Allen, a complex of platinum sulfite acid produces extremely small and well-dispersed particles of platinum on carbon black. The Table below illustrates the relationship between weight loading on carbon black (here Vulcan XC-72), the resulting average platinum crystallite size, and the effective platinum surface area.

TABLE 1

Weight Loading of Platinum as a function of crystallite size and surface area.

| Catalyst loading on Vulcan XC-72, in % (wt/wt) | Average Pt Particle Size Å | Pt Surface Area $m^2/g$ |
|---|---|---|
| 10 | 20 | 140 |
| 20 | 25 | 112 |

TABLE 1-continued

Weight Loading of Platinum as a function of crystallite size and surface area.

| Catalyst loading on Vulcan XC-72, in % (wt/wt) | Average Pt Particle Size Å | Pt Surface Area m²/g |
|---|---|---|
| 30 | 32 | 88 |
| 40 | 39 | 72 |
| 60 | 88 | 32 |
| 80 | 250 | 11 |

Reproduced from E-TEK, Inc. Gas Diffusion Electrodes and Catalyst Materials, Catalog, 1998, p 15.

While there are clear trends with regards to particle size and effective surface area, it is important to note that the specific activity of the catalyst follows a trend as well. As reviewed by Markovic, Gasteiger, and Ross in *The Journal of the Electrochemical Society*, Vol. 144, No. 5, May 1997, p 1591, the oxygen reduction rate and hence activity of platinum can be highly sensitive to the type and abundance of crystal face (111, 100, and 110). Furthermore, Markovic et al. point that the platinum crystallite size controls the relative abundance of the various face geometries. Since the activity of a CO tolerant alloy depends on the final structure of the alloy crystal, control of metal loading, particle size, and distribution of particle size all play a vital role as well as the actual method of alloy formation.

In one preferred embodiment, manufacture of platinum-molybdenum alloys begins by first depositing platinum on a carbon black. Colloidal particles of Pt oxide are deposited on a carbon support from an aqueous solution of a platinum precursor containing the support material. In order to form a colloid, the platinum containing species can be subjected to an oxidizing agent or the solution can be simply evaporated. Although Pt sulfite acid is the preferred choice for the precursor, chloroplatinic acid could alternatively be used. In a second step, discrete particles of Mo oxide are deposited on the Pt oxide containing carbon support by adsorption of colloidal Mo oxide or Mo blue, formed in situ by mild reduction of a solution containing a Mo precursor, for instance an ammonium molybdate solution or a solution containing Mo with alkali hydroxide. Several chemical reducing agents may be employed as well known to one skilled in the art, for example hydrazine, formic acid, formaldehyde, oxalic acid, hydrogen or metals having a sufficiently low potential such as molybdenum and zinc: another method for reducing the Mo containing solution consists in feeding said solution to an electrochemical cell, applying direct current thereto and reducing the Mo precursor at the cathode. After drying, the catalyst is first subjected to a reducing atmosphere between 500 and 900° C., and then alloyed at higher temperature (for instance at 900 to 1200° C.) in the same reducing atmosphere or in an inert one: in one preferred embodiment, it may be reduced at 500–800° C. in $H_2$ gas, then heat treated at 800–1200° C. in Ar gas to form the alloy phase of Pt and Mo. In another preferred embodiment, reduction and alloying are both performed in a $H_2$ environment between 500 and 1200° C., either in a single or in two subsequent temperature steps. This general method is applicable to preparations of Pt:Mo alloys supported on amorphous and/or graphitic carbon materials with a ratio of Mo alloyed with Pt from 1 to 50 atomic % and a total metal loading on the carbon support from 1–90%. It is however preferred that the total metal loading be comprised between 10 and 40%. This method produces a carbon supported Pt:Mo alloy catalyst with a metal particle size of approximately 300 Å or less.

Other methods for preparing carbon supported Pt:Mo alloys of the same characteristics will be given in detail in the following examples.

Catalysts produced in this manner are readily incorporated into gas diffusion electrodes For example Pt:Mo catalysts thus prepared can be incorporated into structures similar to the commercially available ELAT® (E-TEK, Inc., Natick, Mass.). Here, a carbon cloth serves as the web. A layer of Shawinigan Acetylene Black (SAB) mixed with polytetrafluoroethylene binder (e.g. Teflon® commercialized by DuPont, Wilmington, Del.) serves as the wetproofing layer on each side of the web. Finally, layers of carbon black such as Vulcan XC-72 with the alloy Pt:Mo are coated onto one side of the assembly: preferably, the specific loading of metal with respect to the active area is comprised between 0.1 and 5 mg/cm². After the final coat, the assembly may be sintered in air at a temperature sufficient to cause the binder to flow, typically 300–350° C. Allen et al. in U.S. Pat. No. 4,293,396 further describe the construction of this type of gas diffusion electrode. Such catalysts can also be incorporated in other gas diffusion electrode structures, for example the electrodes in co-pending patent "Improved Structures and Methods of Manufacture for Gas Diffusion Electrodes and Electrode Components" are suitable as well as described in U.S. provisional application Serial No. 60/070,342 filed Jan. 2, 1998.

These carbon-supported alloys can also be deposited onto the surface of an ion conducting membrane such as Nafion® or Gore Select® commercialized respectively by DuPont and Gore and Associates, Elkton, Md. Wilson and references therein have described methods for such operations in U.S. Pat. No. 5,234,777. In general, depositing the catalyst on the membrane through a "decal" method (see—Wilson) can create a membrane electrode assembly, or one can apply a paint or ink of catalyst to the membrane, or a catalyzed gas diffusion electrode can be mechanically or heat-pressed against the membrane.

For the examples listed here, we have employed a catalyzed gas diffusion electrode similar to that described in Allen et al. pressed against a Nafion membrane. However, fuel cell tests can be highly dependent on system configuration. For example, the mechanical geometry one uses to make contact between the electrode and the membrane, the flow field geometry employed to feed gasses to anode and cathode, and the method and manner of providing hydrated gasses to the cell can all affect the cell performance. In order to evaluate catalyst performance in the absence of system variables but still as an active component of a gas diffusion electrode, we also employ a simple three-electrode test method.

The three-electrode or "half cell" method fits 1 $c^{m2}$ sample of gas diffusion electrode into an inert holder. The gas-feed side of the gas diffusion electrode is positioned into a plenum whereby an excess of oxygen, air, hydrogen, or hydrogen containing levels of CO is passed at low pressures (on the order of 10 mm of water or less). The face containing the catalyst (that would normally be against the membrane of a PEMFC) is held in a 0.5M $H_2SO_4$ solution at a fixed temperature. The counter electrode is placed directly across the working electrode, and a reference electrode is held in-between the two. The fixed geometry is maintained between the three electrodes through a specially constructed cap. A potentiostat is employed to control the potential and measure the current.

BRIEF DESCRIPTION OF THE DRAWINGS

The invention is now better described by means of the following examples, which are only intended to illustrate but not limit the extent and application of this invention, and resorting to the figures, wherein.

DETAILED DESCRIPTION OF THE INVENTION

EXAMPLE 1

A catalyst composed of 30 wt. % alloy on Vulcan XC-72 whereby the alloy is $Pt_{75}Mo_{25}$ atomic percent begins with the preparation of platinum on carbon according to the method described by Petrow and Allen (U.S. Pat. No. 4,082,699) and is briefly summarized below.

A solution containing 38.66 ml of a 200 g/l platinum (II) sulfite acid solution in 1.3 l of deionized $H_2O$ is neutralized to pH 4.0 with a dilute (~1M) $NH_4OH$ solution. 21 g of Vulcan XC-72 is slurried with the platinum solution, then dispersed ultrasonically to achieve a homogenous mixture. Using a magnetic stirrer to maintain adequate mixing, 125 ml of a 30 wt % $H_2O_2$ solution is added over the course of ~30 minutes. The slurry is allowed to stir for 1 hour, then the pH is adjusted to 4.0 with a dilute $NH_4OH$ solution. 75 ml of 30 wt % $H_2O_2$ solution are added over the course of ~20 minutes and the slurry is stirred for 1 hour. The pH of the slurry is again adjusted to 4.0, then the slurry is heated to 70° C. The solids are filtered to remove the supernatant liquid, washed with hot deionized $H_2O$ to remove any soluble salts, then dried at 125° C. to remove moisture.

In a second step, the platinum containing carbon catalyst prepared above is ground to a powder, then dispersed ultrasonically in 500 ml of deionized $H_2O$. An ammonium molybdate solution is prepared by dissolving 1.902 g of $MoO_3$ in ~25 ml of concentrated $NH_4OH$ solution and removing the excess ammonia by heating and stirring. This clear solution is added to the platinum catalyst slurry under stirring and the pH is adjusted to ~1.8 with dilute $H_2SO_4$. One ml of a 16 wt % $N_2H_4$ solution is added to form colloidal $MoO_{3-x}$ (molybdenum blue) in-situ and the slurry allowed to stir ~8 hours. The addition of the reducing agent is repeated twice more over 24 hours to ensure a complete reaction, then the slurry is heated to 70° C. The solids are filtered to remove the supernatant liquid, washed with hot deionized $H_2O$ to remove any soluble salts, then dried at 125° C. to remove moisture. After grinding to a powder, the catalyst is hydrogen reduced at 800° C. for 1 hour, then heat treated at 1000° C. for 1 hour in flowing argon gas to form the alloy phase.

EXAMPLE 2

A catalyst composed of 30 wt. % alloy on Vulcan XC-72 whereby the alloy is $Pt_{80}Mo_{20}$ atomic percent follows that of Example 1 except 40.07 ml of a 200 g/l platinum (II) sulfite acid solution is substituted in the first step and 1.478 g of $MoO_3$ is substituted in the second step.

EXAMPLE 3

A catalyst composed of 30 wt. % alloy on Vulcan XC-72 whereby the alloy is $Pt_{85}Mo_{15}$ atomic percent follows that of Example 1 except 40.97 ml of a 200 g/l platinum (II) sulfite acid solution is substituted in the first step and 1.209 g of $MoO_3$ is substituted in the second step.

EXAMPLE 4

A catalyst composed of 30 wt. % alloy on Vulcan XC-72 whereby the alloy is $Pt_{75}Mo_{25}$ atomic percent follows that of Example 1 except that the colloidal solution of $MoO_{3-x}$ (Molybdenum Blue) is prepared separately, following the same general method described to form this species in situ, then added to the platinum on carbon slurry. The colloidal $MoO_{3-x}$ particles are readily adsorbed on the carbon surface adjacent to the deposited platinum. After filtration and drying, the alloy phase is formed as previously described.

EXAMPLE 5

A catalyst composed of 30 wt. % alloy on Vulcan XC-72 whereby the alloy is $Pt_{75}Mo_{25}$ atomic percent follows that of Example 1 except that a colloidal solution of $PtO_x$ is prepared by evaporation, of the platinum (II) sulfite acid solution to dryness, then dissolving the solids in $H_2O$ to form a stable colloidal dispersion. A colloidal solution of $MoO_{3-x}$ (Molybdenum Blue) is also prepared separately following the same general method used to form this species in situ. The two colloidal dispersions are then added concurrently to a slurry of Vulcan XC-72 in $H_2O$ allowing the $PtO_x$ and $MoO_{3-x}$ species to adsorb on the carbon surface. After filtration and drying, the alloy phase is formed as previously described.

Comparative Example 6

A catalyst composed of 30 wt. % platinum on Vulcan XC-72 is prepared as follows. The platinum addition method as described in Example 1 is followed except now the amount of platinum (II) sulfite acid solution added is 45.00 ml, and after drying, the 30 wt. % platinum on Vulcan catalyst powder is $H_2$ reduced at 500° C. for ½ hour.

Comparative Example 7

A catalyst composed of 30 wt. % alloy on Vulcan XC-72 whereby the alloy is $Pt_{50}Ru_{50}$ atomic percent is prepared as follows. The platinum addition method as described in Example 1 is followed except now a combination of 29.64 ml of platinum (II) sulfite acid solution and 76.80 ml of ruthenium (II) sulfite acid solution is added to 1.3 l of deionized $H_2O$. Oxidation of the mixed sulfite acid solution with 30 wt. % $H_2O_2$ results in a mixed transient colloidal solution containing discrete particles of $PtO_x$ and $RuO_x$ that adsorb simultaneously on the carbon surface. After drying, the 30 wt. % $Pt_{50}Ru_{50}$ on Vulcan catalyst powder is $H_2$ reduced at 230–250° C. for 1 hour to form the alloy phase.

Comparative Example 8

A catalyst composed of 30 wt. % alloy on Vulcan XC-72 whereby the alloy is $Pt_{95}Sn_5$ atomic percent follows the method described in Example 1 except that the amount of platinum (II) sulfite acid solution added is 43.60 ml in the initial step. In the second step, 2.364 g of a stable $SnO_2$ colloid, commercially available from Nyacol Products Inc., Ashland, Mass., (15 wt. % $SnO_2$) is added to the Pt on Vulcan XC-72 catalyst powder slurry and the discrete $SnO_2$ particles are readily adsorbed on the platinized carbon surface. After filtration and drying, the catalyst powder is $H_2$ reduced at 500° C. for ½ hour then heat treated at 900° C. for 1 hour under flowing argon to form the alloy phase.

Figure 1:
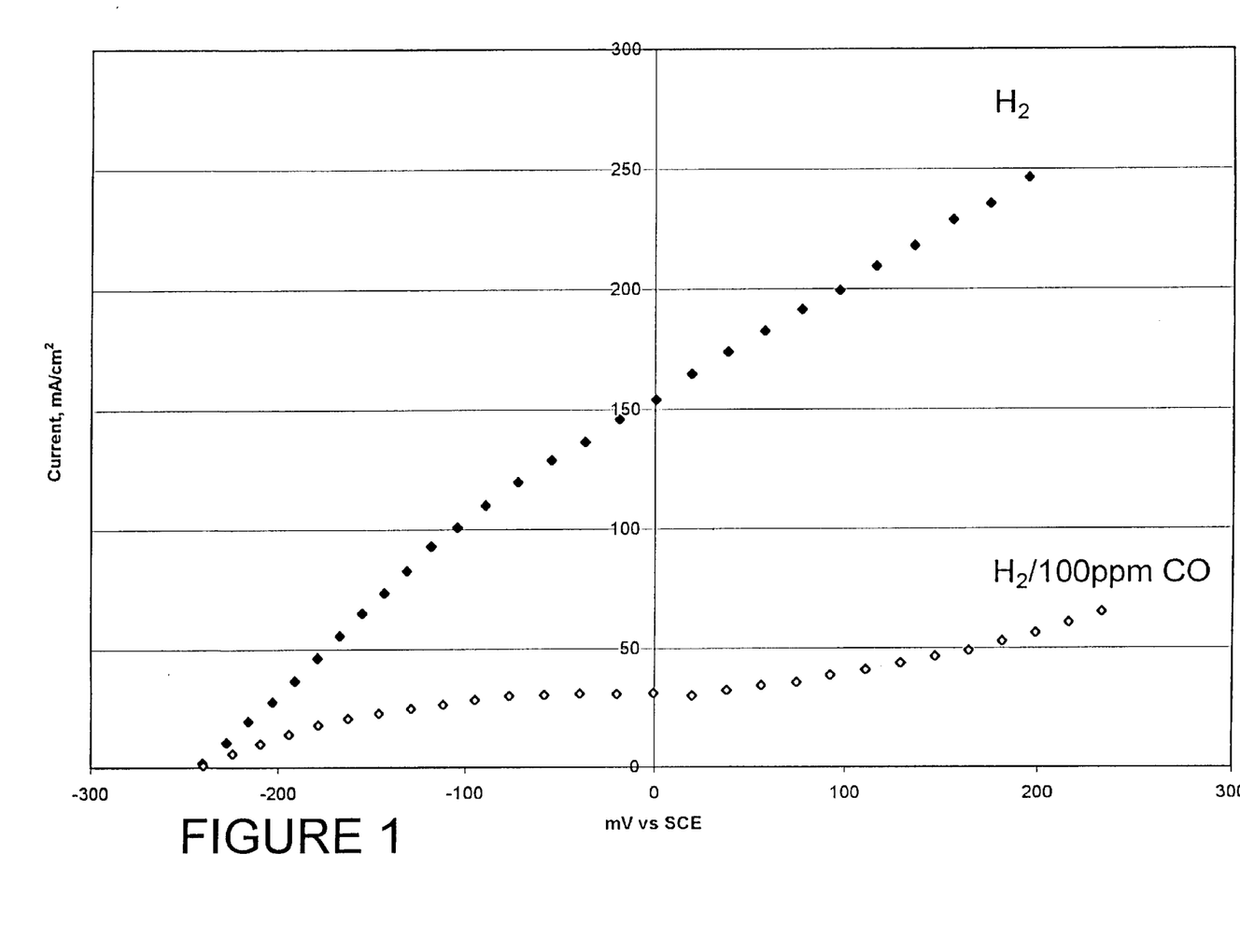
FIG. 1 shows the potentiostated current—potential curves for samples of Standard ELAT® with 1 mg Pt/cm$^2$, 30% Pt/C in 0.5M $H_2SO_4$, at approximately 55° C., with and without 100 ppm CO in hydrogen. Platinum foil 3×2 cm serves as the counter electrode. A standard calomel electrode serves as the reference. Reported potentials are corrected for IR using the current interrupt method.
Figure 2:
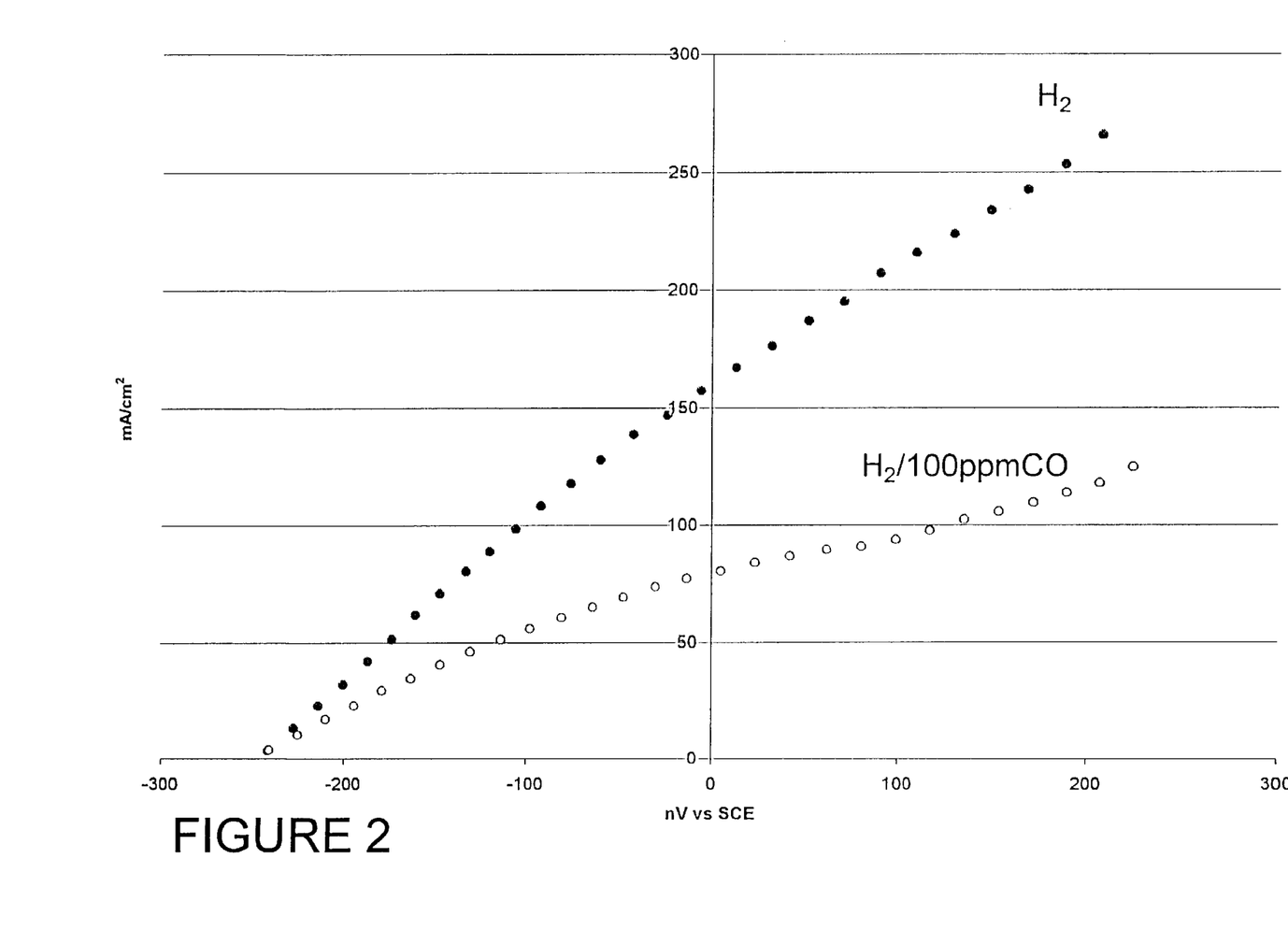
FIG. 2 shows potentiostated current—potential curves for samples of Standard ELAT™ with 1 mg $Pt_{50}$:$Ru_{50}$/cm$^2$, 30%Metal/C in 0.5M $H_2SO_4$, at approximately 55° C., with and without 100 ppm CO in hydrogen. Platinum foil 3×2 cm serves as the counter electrode. A standard calomel electrode serves as the reference. Reported potentials are corrected for IR using -tie current interrupt method.
Figure 3:
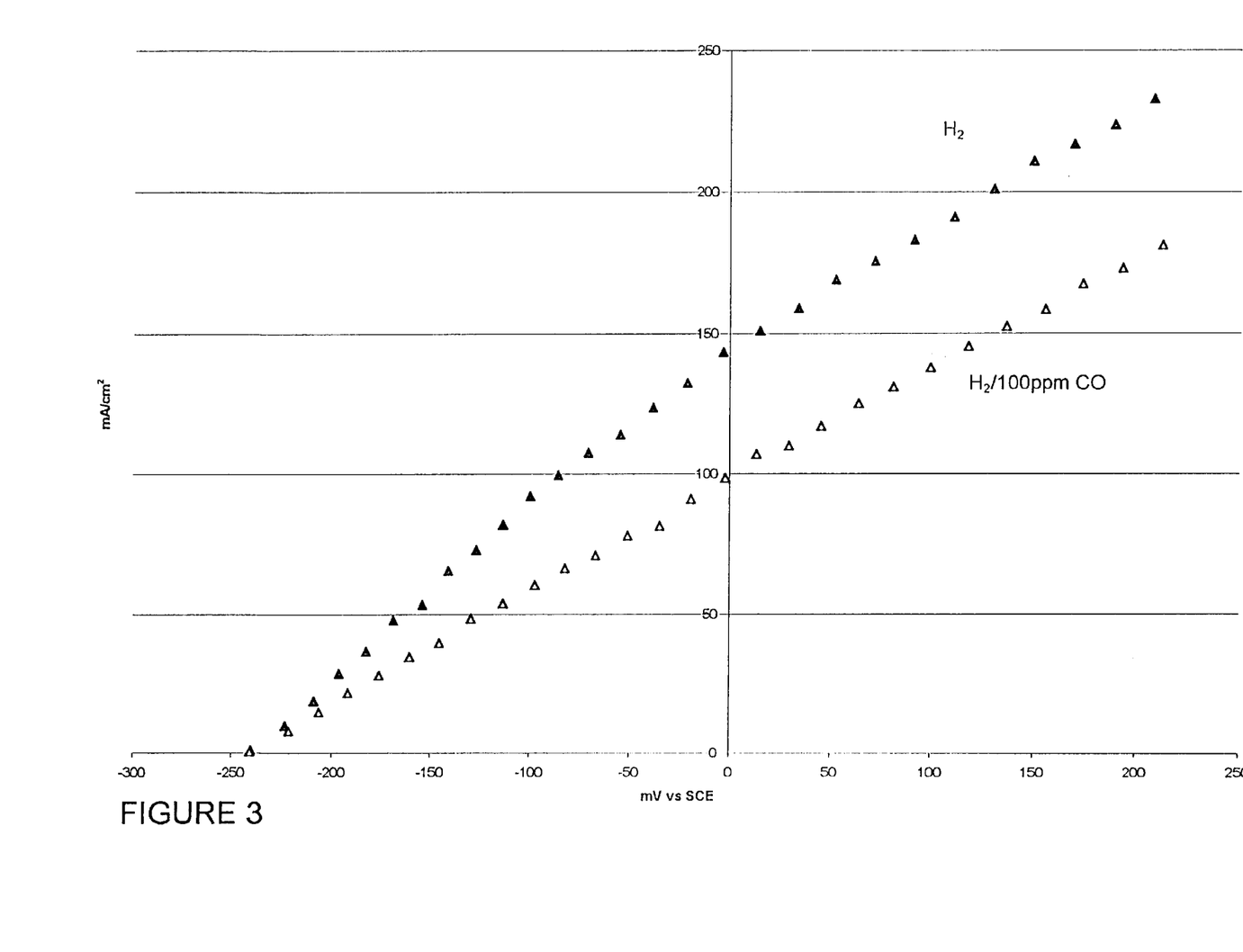
FIG. 3 shows potentiostated current—potential curves for samples of Standard ELAT™ with 1 mg $Pt_{75}$:$Mo_{25}$/cm$^2$, 30% Pt/C in 0.5M $H_2SO_4$, at approximately 55° C., with and without 100 ppm CO in hydrogen. Platinum foil 3×2 cm serves as the counter electrode. A standard calomel electrode serves as the reference. Reported potentials are corrected for IR using the current interrupt method.
Figure 4:
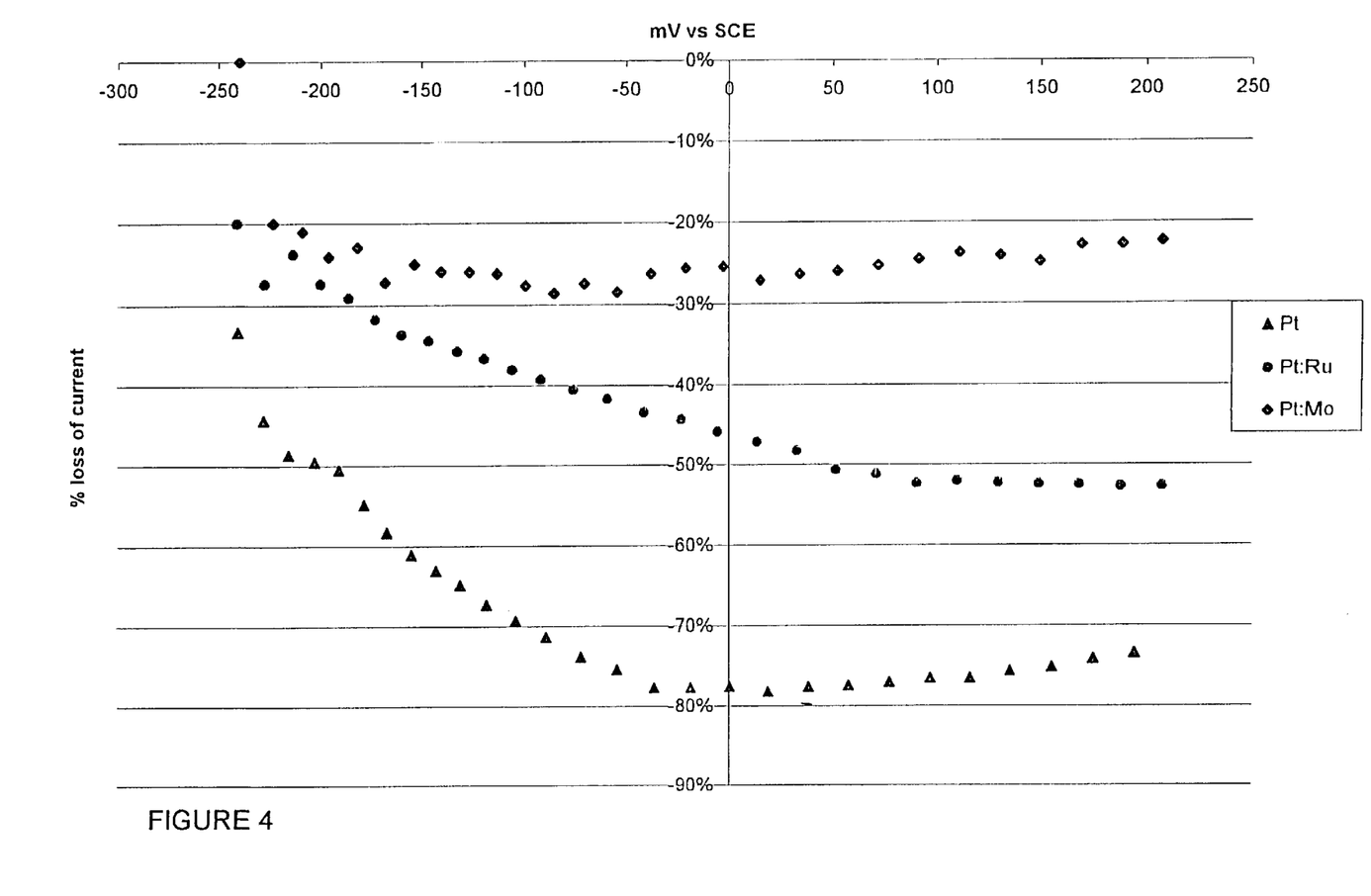
FIG. 4 shows a calculation of percent loss of hydrogen current due to 100 ppm CO vs. applied potential, from the tests of FIGS. 1, 2, and 3. Based on average of three or more samples. Conditions as in FIG. 1.

The catalysts as described above are incorporated into a standard gas diffusion electrode and subjected to small-scale testing free of system variables. FIGS. 1, 2, and 3 show the results of several samples of each (platinum, $Pt_{50}:Ru_{50}$, and $Pt_{75}:Mo_{25}$) being subjected to either hydrogen or hydrogen contaminated with 100 ppm CO. These are considered "driven" cells in as much as the potentiostat applies a potential, the feedgas is consumed, and current is developed. In FIG. 1 one readily notes the devastating effects of CO on pure supported platinum: current is reduced dramatically. FIG. 2 employs the comparative example $Pt_{50}:Ru_{50}$ subjected to the same conditions. Here some resistance to poisoning is noted. FIG. 3 is $Pt_{75}:Mo_{25}$ subjected to pure $H_2$ and $H_2$ with 100 ppm CO. It is significant to note that at the higher applied potentials (100–200 mV vs. SCE), the current for the new alloy does not appear to plateau as in the $Pt_{50}:Ru_{50}$. FIG. 4 illustrates the resilience of $Pt_{75}:Mo_{25}$ more clearly. In this Figure, instead of plotting current on the ordinate axis, the loss of current due to CO poisoning is plotted as a function of percent. Thus, the current obtained at the electrodes in hydrogen is compared to the current obtained at 100 ppm CO. Thus, pure platinum results in an approximately 75% loss of current, while $Pt_{50}:Ru_{50}$ is 50%, and $Pt_{75}:Mo_{25}$ is around 25%. These, results illustrate an improvement over the current state of the art and verify that forming the platinum molybdenum alloy on a carbon black support is viable method for preparing a catalyst for high hydrogen oxidation activity in the presence of moderate levels of CO.

Figure 5:
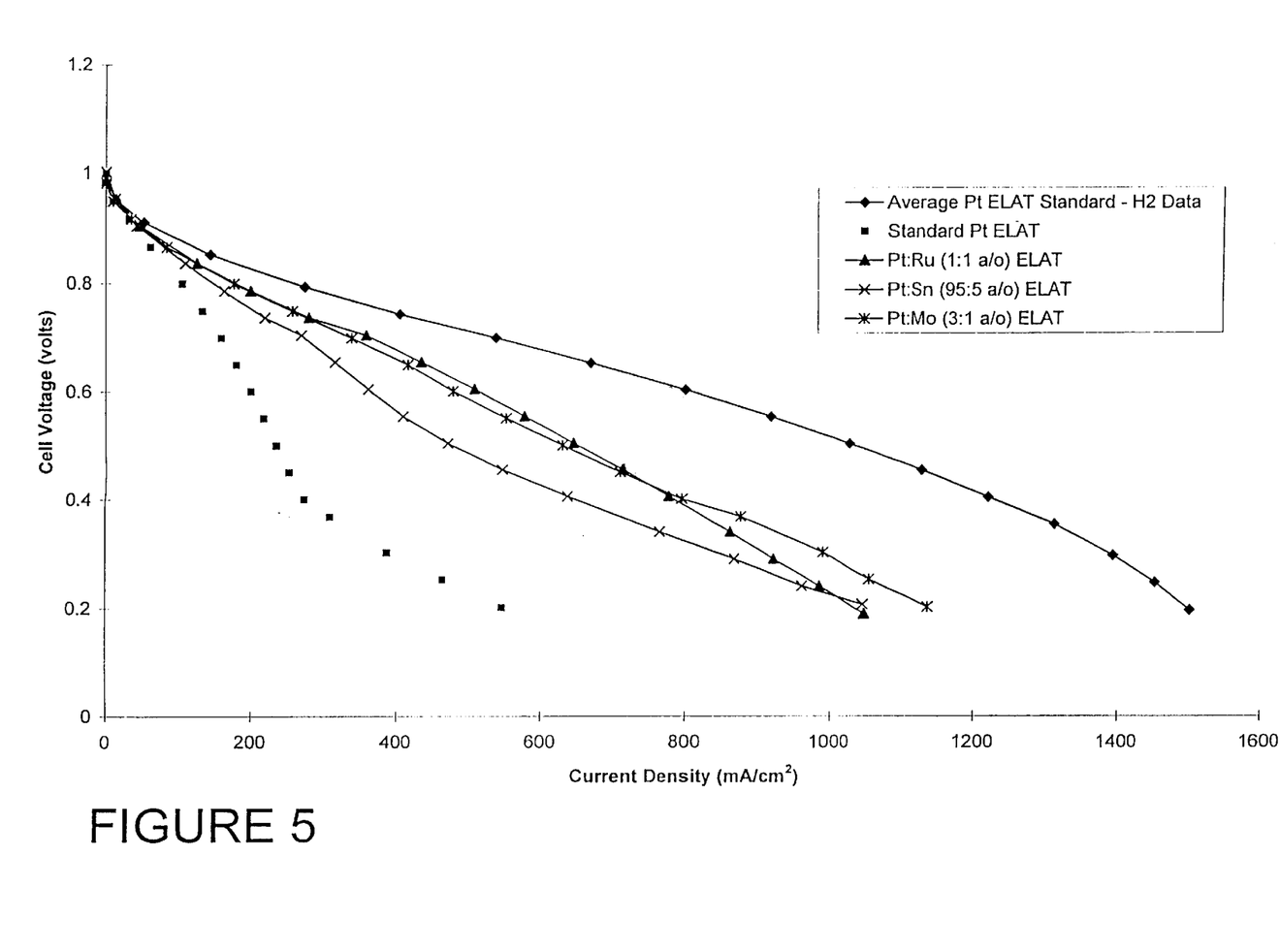
FIG. 5 shows a comparison of anode catalysts (Pt, $Pt_{50}Ru_{50}$, $Pt_{95}$:$Sn_5$, and $Pt_{75}$:$Mo_{25}$) in standard ELAT™ Gas Diffusion Electrodes, 1.0 mg/cm$^2$ total metal loading using 30% Metal/C, 16 cm$^2$ Active Area, Nafion 115, Pressure for Fuel/Air—3.5/4.0 BarA, temperature 70° C., with a hydrogen contamination of 16 ppm CO.

The next set of Figures affirms that the advances observed on the small scale are operative within a fuel cell system. FIG. 5 shows a family of curves generated on a single 16 $c^{m2}$ cell operating as an air/hydrogen fuel cell. The electrodes and catalysts represented here are prepared as described above. Unlike the previous experiments, the fuel cell generates current and voltage proportional to the power available from the system and the load placed on this system. Within his family of current—potential curves two reference examples are displayed. The top curve labeled "average Pt ELAT—$H_2$ data" is the case of pure hydrogen over a supported platinum catalyst, i.e., the best case. The bottom curve of the family, labeled "Standard Pt ELAT" is the example of a supported platinum catalyst being subjected to the CO contaminated hydrogen feed, i.e., the worst case.

Figure 6:
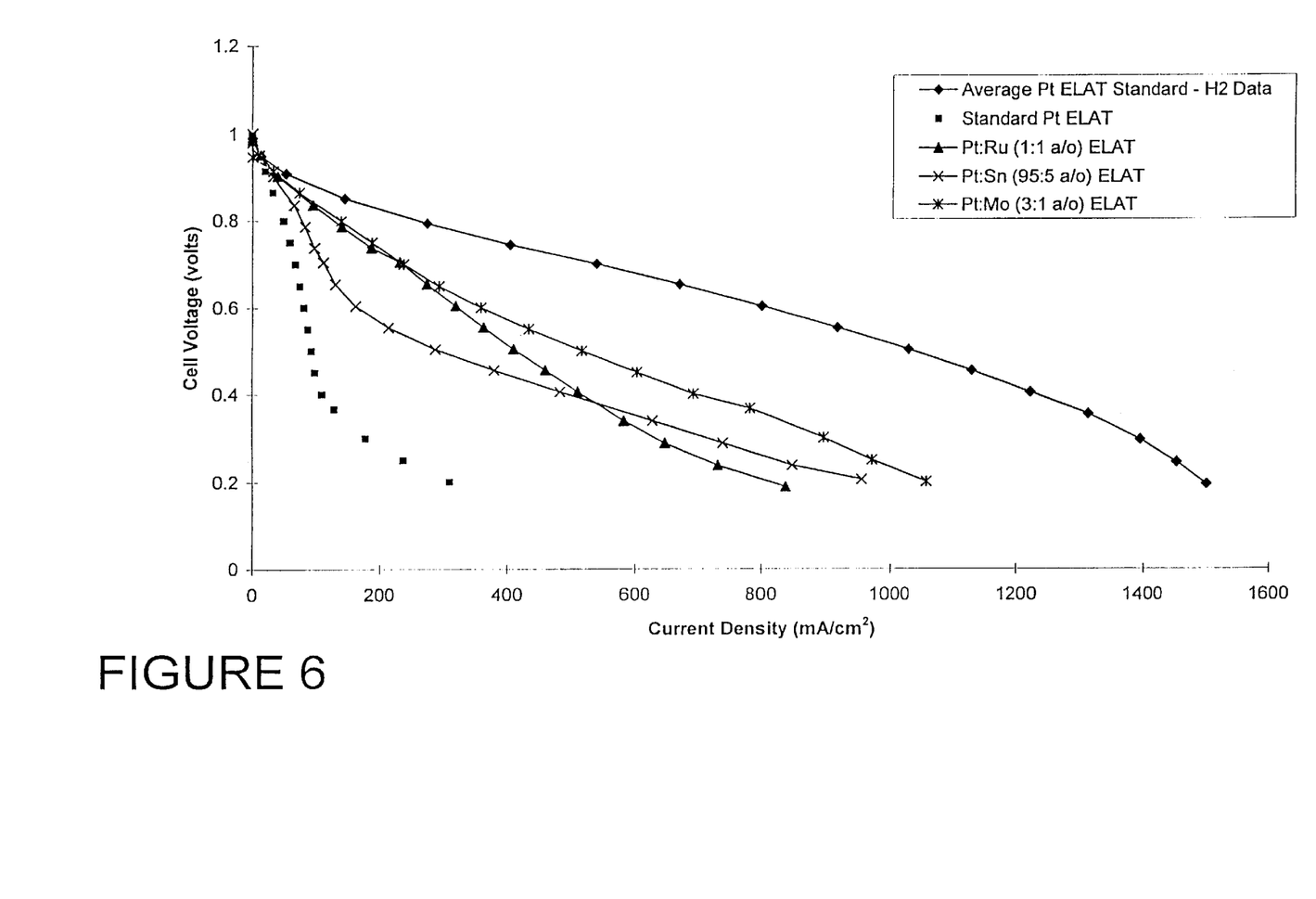
FIG. 6 shows a comparison of anode catalysts (Pt, $Pt_{50}Ru_{50}$, $Pt_{95}$:$Sn_5$, and $Pt_{75}$:$Mo_{25}$) in standard ELAT™ Gas Diffusion Electrodes, 1.0 mg/cm$^2$ total metal loading using 30% Metal/C, 16 cm$^2$ Active Area, Nafion 115, Pressure for Fuel/Air—3.5/4.0 BarA, temperature 70° C., with a hydrogen contamination of 100 ppm CO.
Figure 7:
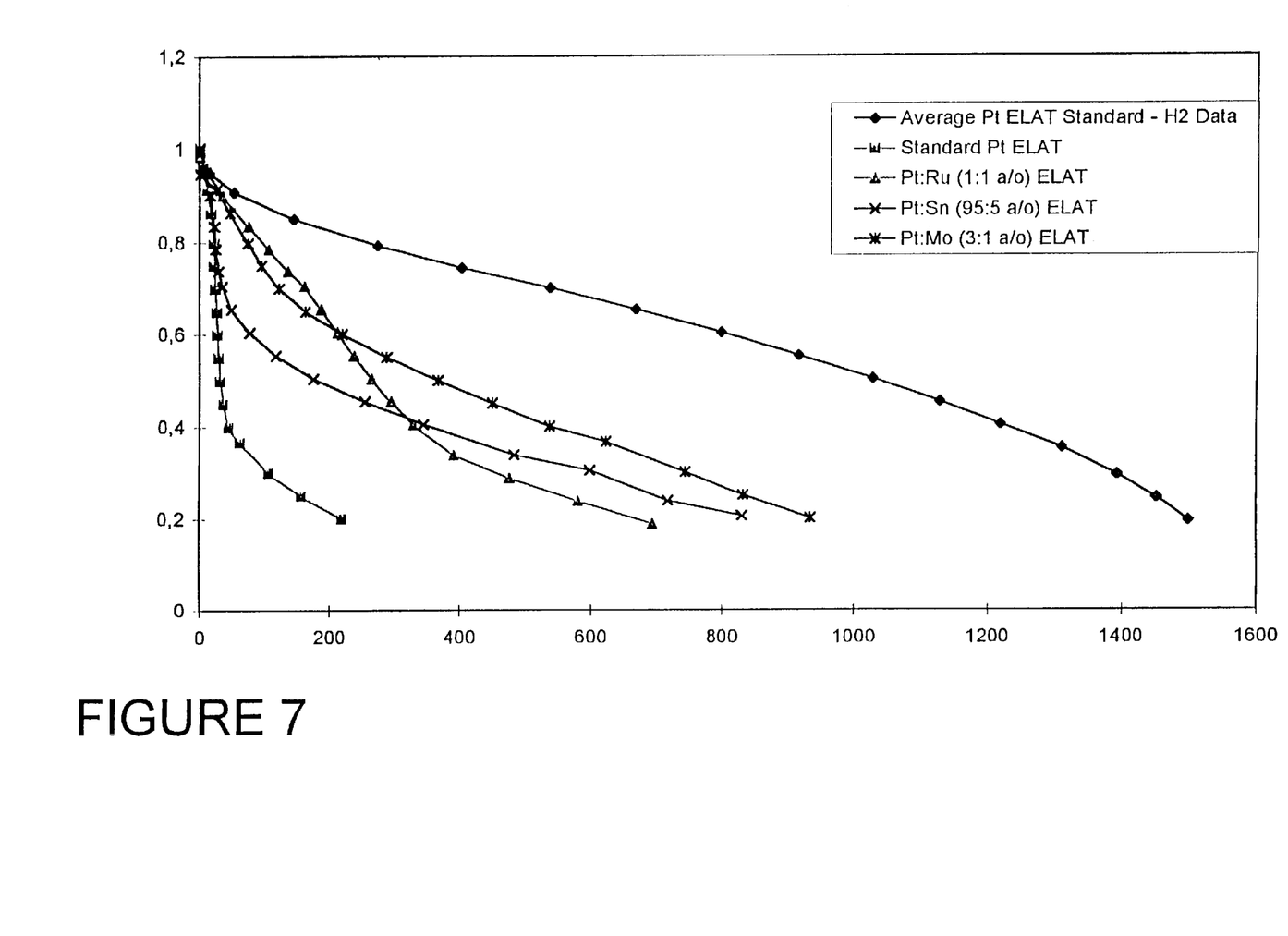
FIG. 7 shows a comparison of anode catalysts (Pt, $Pt_{50}Ru_{50}$, $Pt_{95}$:$Sn_5$, and $Pt_{75}$:$Mo_{25}$) in standard ELAT™ Gas Diffusion Electrodes, 1.0 mg/cm$^2$ total metal loading using 30% Metal/C, 16 cm$^2$ Active Area, Nafion 115, Pressure for Fuel/Air—3.5/4.0 BarA, temperature 70° C., with a hydrogen contamination of 970 ppm CO.

Thus, FIG. 5 shows the effects of three different alloy combinations being subjected to 16 ppm CO in the hydrogen. At this low level of CO, only small differences arise between the three alloys, although the $Pt_{75}:Mo_{25}$ appears slightly better-performing at the higher current densities. FIG. 6 is a plot of a similar family of curves except now there is 100 ppm CO contamination. At this level of CO, one notes that higher currents and voltages are obtained from the $Pt_{75}:Mo_{25}$ alloy compared to either $Pt_{50}:Ru_{50}$ or $Pt_{95}:Sn_5$. Similarly, the plot of FIG. 7 shows the same electrodes subjected to 970 ppm CO in hydrogen with the same result: the $Pt_{75}:Mo_{25}$ alloy provides the greatest resistance to CO poisoning.

Figure 8:
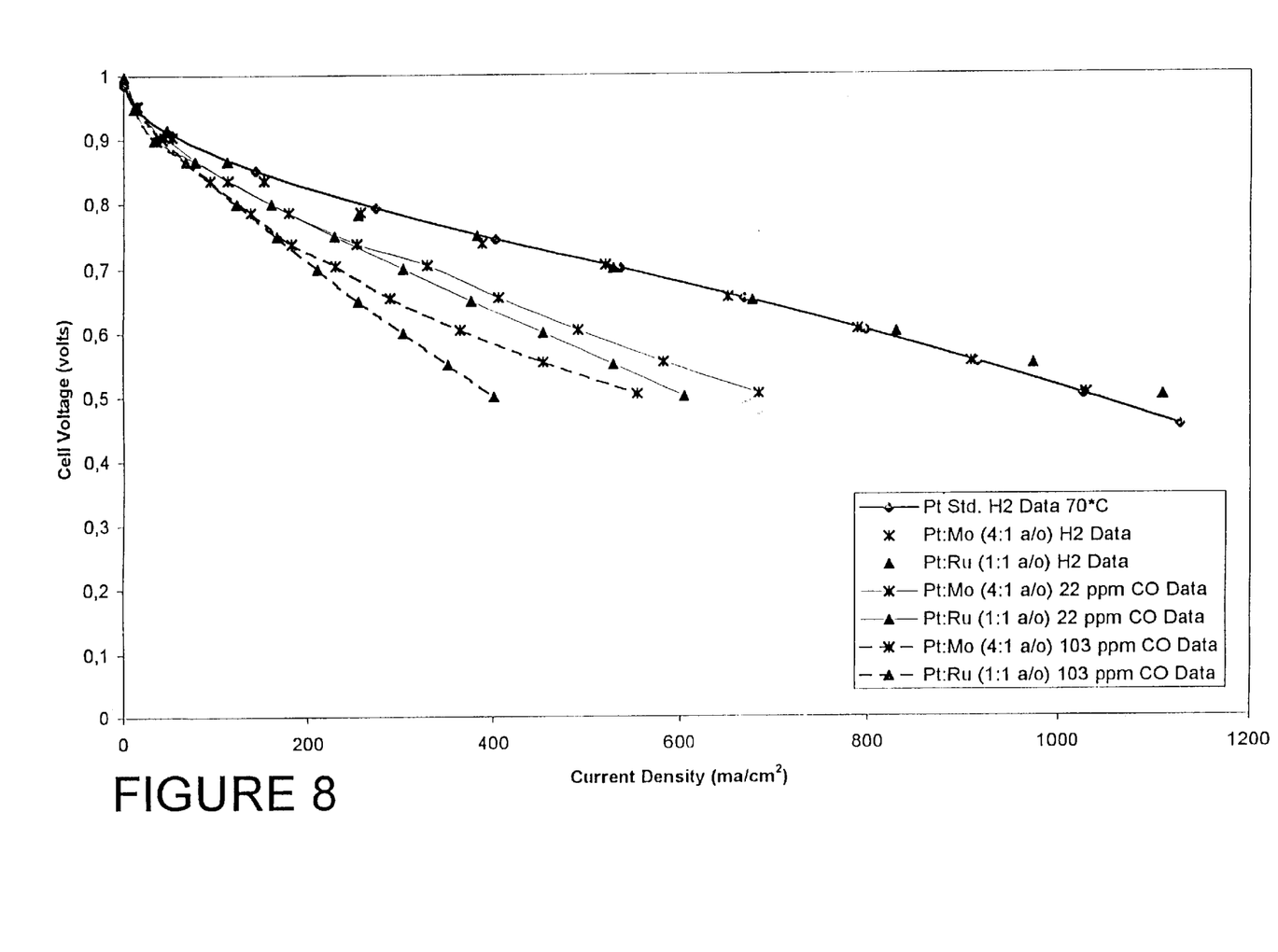
FIG. 8 shows a comparison of Anode Catalysts (Pt, $Pt_{50}Ru_{50}$, $Pt_{80}$:$Mo_{20}$) in standard ELAT™ Gas Diffusion Electrodes, 1.0 mg/cm$^2$ total metal loading using 30% Metal/C, 16 cm$^2$ Active Area, Nafion 115, Pressure for Fuel/Air—3.5/4.0 BarA, temperature 70° C., with a hydrogen contamination of 22 and 103 ppm CO.

A similar alloy is prepared except now the amount of Mo is decreased to form a $Pt_{80}:Mo_{20}$ alloy. FIG. 8 compares ELAT electrodes assembled with this catalyst compared to the standard $Pt_{50}:Ru_{50}$ catalyst under 22 and 103 ppm CO in hydrogen. This Figure more clearly shows higher currents being obtained for a fixed voltage with the Pt:Mo over Pt:Ru, especially over the voltage region of 0.6 to 0.7V, which is considered a more efficient operating voltage for the fuel cell stack.

Similar experiments were performed over a range of temperatures, from 60° C. to 90° C., and currents obtained at 0.7 and 0.6 V are tabulated for comparison. Refer to Tables 1–4 below. A column within the Tables is the calculation of the percent decrease from pure hydrogen when the alloys are subjected to each level of carbon monoxide. In all cased, through all temperatures, the $Pt_{80}:Mo_{20}$ shows a smaller percent decrease than Pt:Ru. In all cased, the $Pt_{80}:Mo_{20}$ catalyst yielded greater current than the commercially employed Pt:Ru. These results confirm that the Pt:Mo alloy is an improved anode catalyst for a fuel cell whereby hydrogen can be oxidized in the presence of carbon monoxide.

TABLE 1

Comparison of Pt4Mo to Pt:Ru at 60° C.

| | H2 | 22 ppm CO | % decrease | 103 ppm CO | % decrease |
|---|---|---|---|---|---|
| Current at 0.7 V, 60° C. | | | | | |
| Pt4:Mo | 471 | 243 | −48% | 162 | −66% |
| Pt:Ru | 459 | 219 | −52% | 149 | −68% |
| Current at 0.6 V, 60° C. | | | | | |
| Pt4:Mo | 711 | 356 | −50% | 272 | −62% |
| Pt:Ru | 728 | 317 | −56% | 208 | −71% |

TABLE 2

Comparison of Pt4Mo to Pt:Ru at 70° C.

| | H2 | 22 ppm CO | % decrease | 103 ppm CO | % decrease |
|---|---|---|---|---|---|
| Current at 0.7 V, 70° C. | | | | | |
| Pt4:Mo | 521 | 330 | −37% | 231 | −56% |
| Pt:Ru | 530 | 304 | −43% | 211 | −60% |
| Current at 0.6 V, 70° C. | | | | | |
| Pt4:Mo | 790 | 492 | −38% | 365 | −54% |
| Pt:Ru | 831 | 455 | −45% | 304 | −63% |

TABLE 3

Comparison of Pt4Mo to Pt:Ru at 80° C.

| | H2 | 22 ppm CO | % decrease | 103 ppm CO | % decrease |
|---|---|---|---|---|---|
| Current at 0.7 V, 80° C. | | | | | |
| Pt4:Mo | 541 | 404 | −25% | 300 | −45% |
| Pt:Ru | 570 | 371 | −35% | 273 | −52% |
| Current at 0.6 V, 80° C. | | | | | |
| Pt4:Mo | 825 | 599 | −27% | 453 | −45% |
| Pt:Ru | 877 | 555 | −37% | 398 | −55% |

TABLE 4

Comparison of Pt4:Mo to Pt:Ru at 90° C.

| | H2 | 22 ppm CO | % decrease | 103 ppm CO | % decrease |
|---|---|---|---|---|---|
| Current at 0.7 V, 90° C. | | | | | |
| Pt4:Mo | 578 | 475 | −18% | 386 | −33% |
| Pt:Ru | 573 | 461 | −20% | 343 | −40% |
| Current at 0.6 V, 90° C. | | | | | |
| Pt4:Mo | 858 | 689 | −20% | 564 | −34% |
| Pt:Ru | 891 | 694 | −22% | 508 | −43% |

Even if the invention has been described making reference to specific embodiments, it must be understood that modifications, substitutions, omissions and changes of the same are possible without departing from the spirit thereof and are intended to be encompassed in the appended claims.

We claim:

1. A method of preparing a carbon black supported catalyst for use in gas diffusion electrodes having a bulk atomic ratio of platinum to molybdenum of 3:1 to 5:1, comprising first preparing a slurry of a platinum containing carbon catalyst followed by adding a solution containing at least one molybdenum species, adding at least one reducing agent, and finally alloying the two elements in a reducing and/or inert atmosphere at a temperature above 300° C.

2. The method of claim 1 wherein said at least one molybdenum species is selected from the group comprising MoO3, molybdenum acid and molybdates.

3. The method of claim 2 wherein said at least one reducing agent is selected from the group comprising hydrazine, molybdenum metal, zinc, hydrogen, formic acid, formaldehyde and oxalic acid.

4. The method of claim 1 wherein said at least one reducing agent is selected from the group comprising hydrazine, molybdenum metal, zinc, hydrogen, formic acid, formaldehyde and oxalic acid.

\* \* \* \* \*